United States Patent Office 3,348,496
Patented Oct. 24, 1967

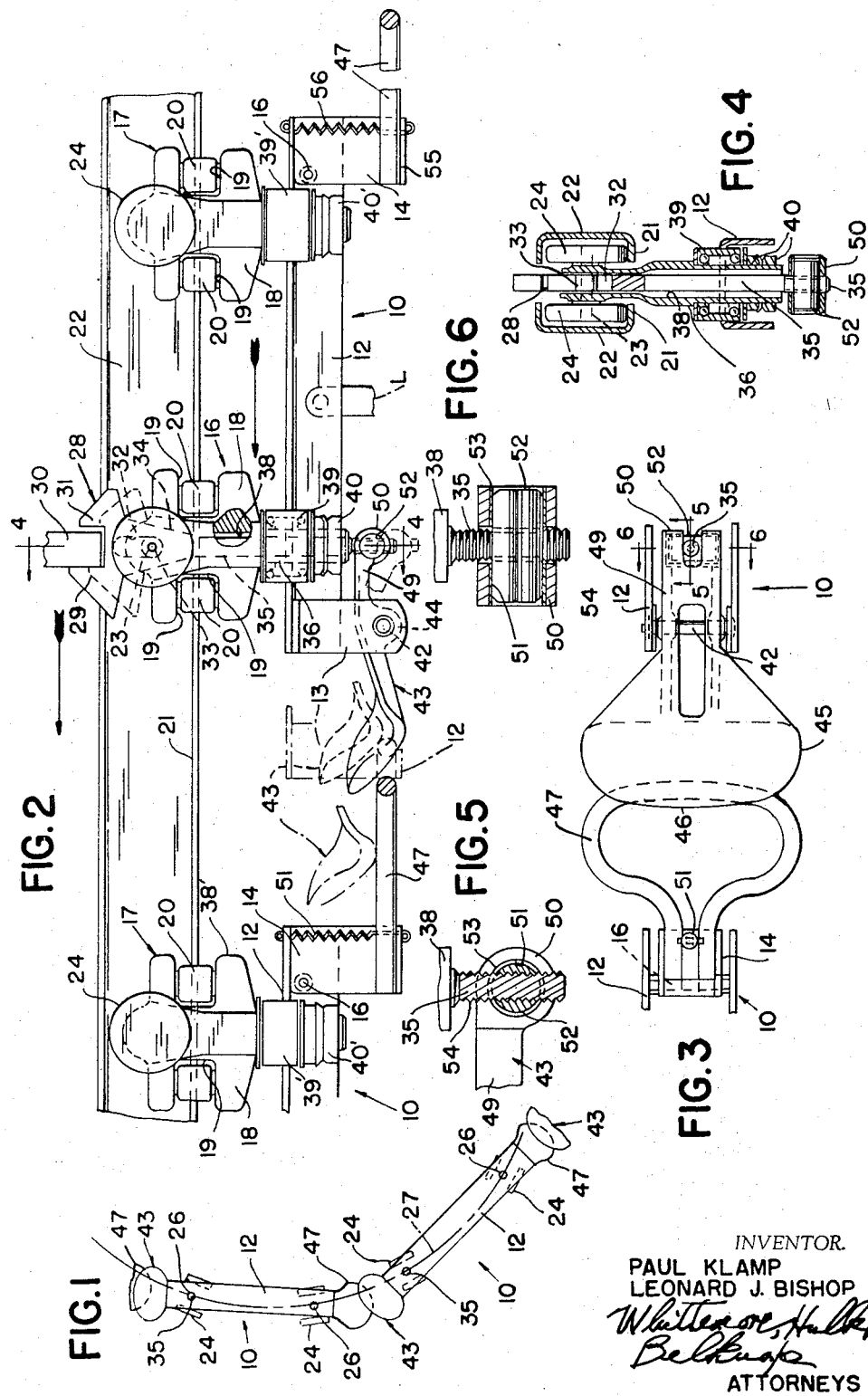

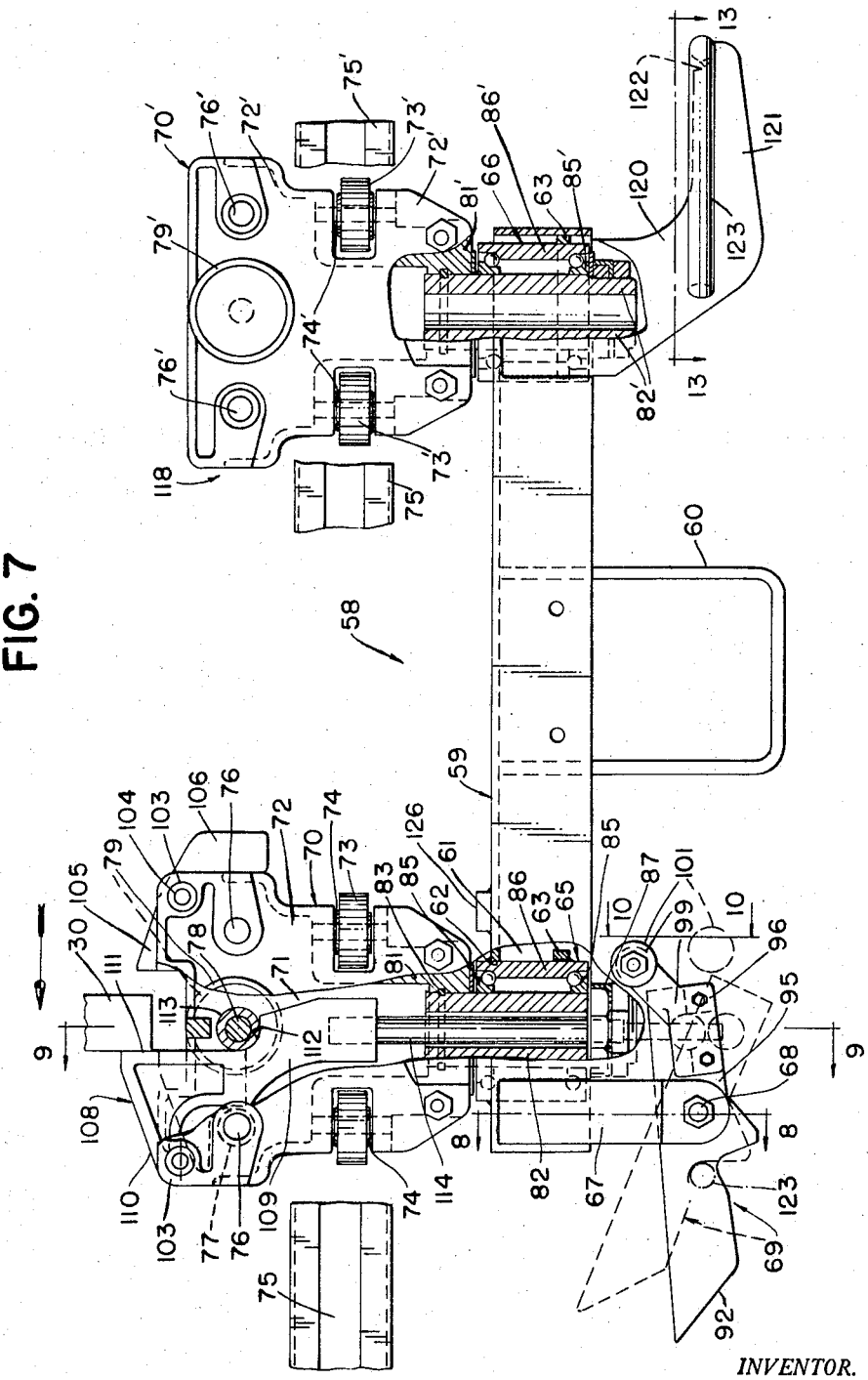

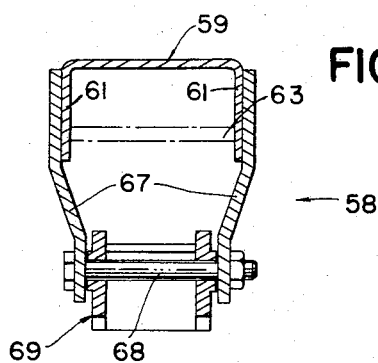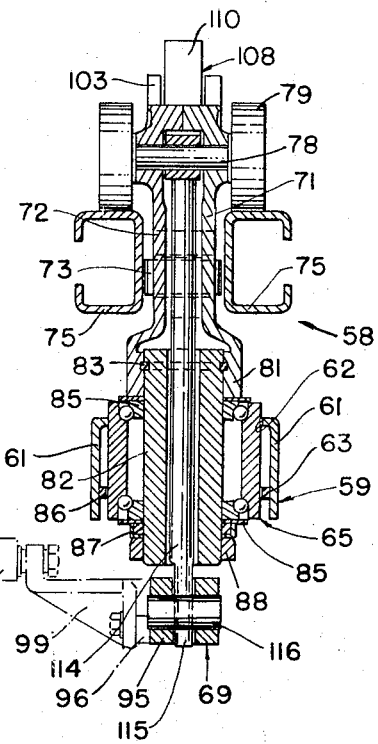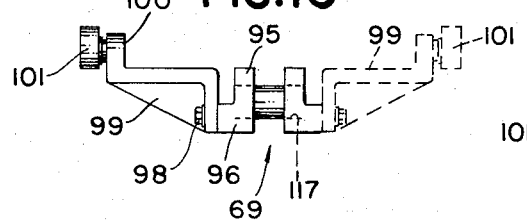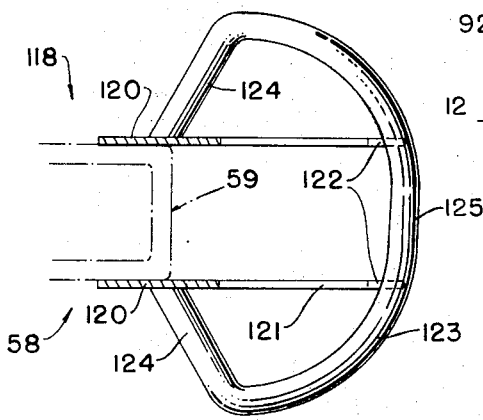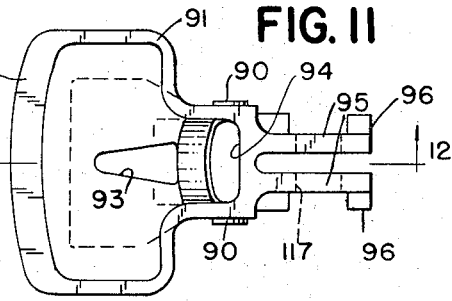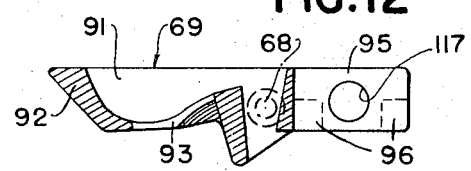

3,348,496
ACCUMULATING CARRIER FOR POWER
AND FREE CONVEYOR SYSTEM
Paul Klamp, St. Clair Shores, and Leonard J. Bishop,
Birmingham, Mich., assignors to Mechanical Handling
Systems, Incorporated, Warren, Mich., a corporation
of Michigan
Filed Oct. 11, 1965, Ser. No. 494,319
12 Claims. (Cl. 104—96)

ABSTRACT OF THE DISCLOSURE

An accumulating carrier is disclosed for use in an overhead power and free conveyor system, or in a related type conveyor application, in which a load carrier, as sustained by suitable trolley means and propelled at the trolley means by suitable continuous propulsion means, travels a track having bends, thus requiring a vertical axis swivel suspension of the load carrier from the trolley means. Accumulation of trolleys and load carriers at certain stations in their travel is through the agency of a bumper or other actuator member on each carrier, upon engagement of this member with another object, such as a preceding stationary carrier or a side track signal unit; and the engagement is effective to produce a vertical movement of a control member of the carrier along the line or axis of the swivel suspension of the latter, to thereby disengage the carrier's trolley means from driving engagement by the propulsion means. To these ends there is disclosed an improved universal type or compound axis operating connection between the actuating and control members, permitting a horizontal swing of the former with the load carrier while not disturbing the vertical movement of the latter in any angular relation of the load carrier to its trolley means.

---

This is a continuation-in-part of our copending application, Ser. No. 419,754, filed Dec. 21, 1964.

The present invention relates to improvements in an accumulation type of load carrier for a factory or like conveyor system. This load carrier is of the general sort suggested in various embodiments of our Letters Patent No. 3,196,805 of July 27, 1965, in that it is one in which a driven dog member of a trolley supporting the load carrier or load bar is automatically disengaged from a driving pusher of a power chain or the like upon impact with the preceding carrier, or with a control mechanism, thus causing the trolleys and the carriers thereof to accumulate end to end as halted.

Still more specifically and in general accordance with the Bishop et al. patent just identified, the release of the carrier's trolley dog from the propelling means is in part effected through the agency of a control member which acts vertically on the axis of a swivel connection of the load carrier or bar proper to its trolley, the control member being in turn operated by impact engagement of a bumper or bumper tongue operatively connected thereto, with a preceding load carrier or a control device. In one of two embodiments illustrated herein the bumper has further means adapted to respond to actuation by a sidetrack control unit, in addition to response to impact. In either case (and particularly as described in connection with FIG. 1 of the Bishop et al. patent) the load carrier may be an elongated one requiring the use of longitudinally spaced pairs of wheeled trolleys as a support and, in rounding a relatively pronounced bend in the overhead track support for the trolleys, the latter will, due to the vertically swiveled connections thereof to the load carrier, be able to track properly around the bend.

Furthermore, and of particular significance in relation to the present improvement, the coaxial relationship of a pin or rod type control member, which supports the trolley dog means for drive by the power pusher, and the swivel axis of the trolley-to-carrier connection insures a proper operation of the dog means by the bumper tongue of the carrier, regardless of a varying angular relationship of the load carrier to the trolley track.

It is a general object of the invention to provide improvements in a trolley-borne, accumulation type load carrier, in which one of the carrier's trolleys has a pusher dog releasably engageable with a chain driven power pusher under the control of a vertically operating control member or rod directly and positively (preferably integrally) connected to the dog. In further accordance with the invention, the control rod also has a positive operating connection to a vertically swingable impact tongue of the load bar, thus maintaining mechanical operating engagement with the tongue during action of the latter.

More specifically, the improved operating connection referred to involves the use of a clevis pin into which a bottom portion of the dog control rod is diametrically and threadedly engaged for a relative swing of the impact or bumper tongue and the control rod in a vertical plane. This provides a positively coupled, rotative connection of the control rod to the bumper tongue, and permits an adjustment of the vertical relationship of control rod to tongue, if desired. However, its essential purpose is to provide, as combined with a clevis action on a horizontal axis, a universal, bi-directional joint coupling the bumper and trolley pusher. The threaded connection constitutes, in this coupling, a bearing journaling the control rod on an upright axis in the clevis pin.

Thus, the improved operating connection of the dog control member or rod to the bumper tongue affords the advantages of a positive connection for the up and down movement of the dog, as distinguished from a mere surface-to-surface engagement of parts (as in the mentioned Bishop et al. patent), and a connection which permits the trolley to track properly in rounding a bend, while still preserving the desired accumulation bumper action at such a zone.

In accordance with one adaptation of the invention, and in distinction over various embodiments illustrated in the Bishop et al. patent, the trolley dog whose movement is controlled by the impact bumper provisions referred to, comprises a pair of integrally connected dog portions, the forward one of which is engageable by a power chain pusher to propel the trolley; and the rear of which is a hold back dog preventing forward movement of the trolley in relation to the chain pusher. The rear dog is to be overcome by the pusher from the rear, thus depressing the entire one-piece dog structure downwardly and permitting a chain pusher to drivingly engage the first or forward dog formation which is higher than the rear formation.

In another modified adaptation especially for use in high speed installations, the rear dog portion is pivoted on the trolley to yield forwardly when overtaken by a conveyor chain pusher, but the forward dog travels bodily vertically under operation by the upright, bumperactuated control rod, as described. The modified alternative embodiment has improved anti-friction ball bearing means for a swivel connection to the load bar.

In still further accordance with the invention, the forward bumper tongue of the load carrier is specially formed to increase its lateral width and insure operation upon engagement with a rear bumper of the preceding trolley, in the event such engagement occurs at a relatively sharp bend in the trolley track structure.

The tongue is also provided, rearwardly of its clevis connection to the control rod, with appropriate follower means adapted to be operated by a selective side track control unit to decouple the trolley dog from the power chain pusher, if this type of control is desired.

While the invention is herein described in reference to a typical application to a power and free conveyor system, it is to be understood that structural provisions of the invention may also find adaptation in other types of conveyor, such as a sub-floor propelled tow truck or an overhead propelled, mast type of floor truck.

The foregoing as well as other objects will become more apparent as this description proceeds, especially when considered in connection with the accompanying drawing illustrating the invention, wherein:

FIG. 1 is a fragmentary schematic view in top plan illustrating in a general way the operation of the improved accumulating carrier;

FIG. 2 is a fragmentary view in side elevation, partially broken away, showing features of one embodiment of the improved trolley-borne load carrier or bar of the invention, and the action of its forward bumper tongue in controlling release of its dog structure from the power chain pusher, various positions of the tongue being indicated in solid, dotted and dot-dash line;

FIG. 3 is a fragmentary top plan view showing the interengaging relationship of forward tongue provisions of one load bar and the rear bumper provisions of a preceding load bar impacted thereby;

FIG. 4 is a view in vertical cross section through the carrier supporting trolley and its control means, along section line 4—4 of FIG. 1;

FIGS. 5 and 6 are, respectively, fragmentary, enlarged scale views in section along lines 5—5 and 6—6 of FIG. 3, FIG. 6 representing an enlargement of a portion of what is shown in FIG. 4;

FIG. 7 is a side elevational view of an improved alternative embodiment of the improved trolley-borne load bar, being partially broken away and in longitudinal vertical section through the axis of trolley dog control and swivel bearing provisions, alternate positions of the forward trolley bumper tongue and trolley dog being illustrated in solid and dotted line;

FIGS. 8 and 9 are, respectively, views in transverse vertical section along lines 8—8 and 9—9 of FIG. 7;

FIG. 10 is a rear elevational view, as from line 10—10 of FIG. 7, further illustrating certain control rod operating means for the trolley dog, which are intended for actuation by a side track control unit, if it is desired to free trolleys from the power pusher in this manner at the starting positions of accumulation areas;

FIG. 11 is a top plan view of the forward bumper body or casting part;

FIG. 12 is a view in vertical section along line 12—12 of FIG. 11; and

FIG. 13 is a view in horizontal section on line 13—13 of FIG. 7 showing the rear bumper means of the carrier or load bar.

In the arrangement of a first embodiment of the structure as illustrated in FIG. 2 of the drawings, the load bar is generally designated by the reference numeral 10, and it includes a rigid body frame in the form of a horizontally elongated inverted channel 12 (see also FIG. 4), within which are received, at the front and rear ends, respectively, a forward depending bracket 13, also of inverted U-shaped outline and welded or otherwise fixedly secured in place, and a rearward swinging bracket 14 of U-outline pivoted on a pin 16 fixed to the walls of U-frame 12 (FIG. 3). The brackets 13, 14 mount bumper provisions to be hereinafter described. A load suspended from carrier 10 is designated L in FIG. 2; and the direction of travel of the carrier is indicated by the arrow in FIG. 2.

The reference numerals 16 and 17 generally designate a pair of generally similar but specifically different trolleys from which the load carrier frame 12 is suspended by swivel connections, as will be described. Each of these trolleys includes a body 18 having front and rear clevis openings 19 for the reception of side guide rollers 20, which are journaled on upright axes for engagement, in the usual manner, between the horizontal bottom flanges 21 of channel beams 22 of a conventional overhead track structure of a factory or like conveyor system, thus maintaining the load carrier 10 for travel in an upright disposition.

Each trolley body 18 also has a pair of axially aligned load wheels or rollers 24 journaled therein on the horizontal axis of an axle 23. These wheels, one on each side of the trolley body, ride upon the horizontal track flanges 21 of the track channels referred to above.

As schematically shown in FIG. 1, the pair of trolleys 16, 17 are necessary when the carrier 10 is a rather elongated one; and the swivel connection of such an elongated carrier to the respective pairs of trolley load wheels 24 on upright axes, designated 26 in FIG. 1, enables the wheels to track properly about a track bend represented by the relatively sharp arc 27 shown in dot-dash line. The axis 26 also represents the axis of vertical action of the pusher dog control provisions of the invention, presently to be described.

In further reference to FIG. 2 of the drawings considered with FIG. 4, the reference numeral 28 generally designates a pusher dog, carried by only the forward trolley 16, which has an upper head portion integrally formed to provide a forward dog formation 29 adapted to be engaged and propelled from the rear by a depending pusher 30 of an overhead power chain, and a rear hold-back dog formation 31. The formation 31 is adapted to engage the pusher 30 from the rear to prevent possible overrun of trolley 16 forwardly of the pusher, and is cammingly engaged from the rear by an overtaking pusher 30, thus depressing the dog 28 as a whole and permitting the pusher to assume the drive position shown in FIG. 2. The significant feature of the structure of dog 28 just described is, however, the fact that in this embodiment the propelled dog formation 29 and the hold-back formation 31 are integrally formed and are adapted to be released from drive engagement by the pusher in a purely vertical downward motion.

Dog 28 is provided, centrally between and beneath the formations 29, 31, with a vertically elongated through-slot 32 which accommodates an anti-friction roller 33 surrounding the midpoint of the axle 23 of load wheels 24, thus to permit a free but guided vertical dog action; and the dog 28 converges downwardly at 34 to a cylindrical integral pin 35 of substantial length. The body 18 of trolley 16 is provided with an integral tubular downward extension 36 providing a bore 38 of substantial diameter, which receives the pin 35 with substantial clearance (FIGS. 2 and 4). The roller and bore provisions permit movement of dog 28 in a manner later described.

Tubular extension 36 has a swivel connection to carrier frame 12 about a vertical axis, through the agency of a two-race ball bearing unit 39, the inner race of which is fixed to extension 36 and the outer race of which is fixed to the channel 12. Retainer nuts 40 threaded upwardly on the tubular extension 36 hold the swivel bearing 39 in place. The embodiment of FIGS. 7-13 better illustrates the bearing provisions.

Referring to FIG. 2, the forward depending bracket 13 on the load bar body 12 is provided with transversely aligned holes which receive a pin 42 upon which a forward impact bumper tongue 43 is pivoted to swing a vertical plane transversely central of the load carrier, the tongue having a pair of laterally spaced ears 44 receiving the pivot pin 42.

Forwardly of the pivot, the tongue 43 flares divergently in the horizontal direction and has a forwardly rounded convex contour at its widest point, as indicated at 45, forwardly of which the tongue curves convexly at 46, completing a generally semi-oval contour. Thus, as sketched in FIG. 1, the enlarged tongue nose will insure engagement, in rounding the relatively sharply arcuate track bend at 27, with a correspondingly wide rear bumper member 47 (to be described) of a preceding load member 12. Tongue 43 is gravity-biased counterclockwise (FIG. 2).

Rearwardly of the bracket 13 and bumper tongue pivot at 42, the tongue has a central extension 49 formed to provide a clevis 50, the transversely aligned holes 51 of which receive a horizontal cylindrical swivel pin 52 (FIGS. 5 and 6) with an appropriate bushing 53 interposed; and the lower end of the trolley dog rod 35 is threaded at 54 for adjustable reception in a tapped opening in the swiveled clevis pin 52.

Thus the connection between the trolley dog control rod or member 35 is not only a positive one, as distinguished from a mere surface-to-surface engagement of a pair of coacting parts, it is also an adjustable one which permits a ready variation in the positioning of the forward impact portion of the tongue, as positively engaged; and the swiveling clevis union adjusts itself automatically to the varying swinging positions of the tongue 32, as illustrated in solid and dot-dash line in FIG. 2 of the drawings.

Thus, when the carrier 10 rounds a curve in the manner of FIG. 1, the guide rollers 20 of the leading trolley 16 force the body 18 of the latter into tangential relation to the track curvature at 27, and the trolley body in turn causes its dog 28 to turn horizontally relative to the carrier frame 12, in turn causing its threaded pin 35 to turn in clevis pin 52.

Accordingly, it is seen that the threaded engagement in this zone, as part of a positively coupled connection of bumper tongue 43 to dog 28, serves primarily as a bearing allowing movement of the carrier 10 around turns, and secondarily as a means for making a minor vertical adjustment, if desired. The up and down movement of a dog 28 caused by the threading action of dog pin 35 in clevis pin 52 is incidental and quite insignificant. Essentially, the clevis movement of the pin 52 in its bearing 53, plus the rotative bearing movement of pin 35 in the pin 52 constitute an adjustable universal or two-directional joint.

As distinguished from previous trolley dog arrangements including those of the above identified Bishop et al. patent, both portions 29, 31 of the dog 28 which are engageable by the power chain pusher 30 descend and are lifted together as a unit, clearing the pusher 30 instantaneously in a vertical direction, and correspondingly reengaging with the pusher from beneath. Dog 28 is urged to its top position by the weight of the forward portion of tongue 43.

As the dog 28 moves in this fashion it is guided and retained in the direction of travel (indicated by arrow in FIG. 2) by the trolley axle's anti-friction roller 33 received in the slot 32 in the dog (FIG. 2). The latter is contained sidewise between the sides of the trolley body, with some slight clearance, as shown in FIG. 4; and the lower end of the dog, at its rod portion 35, moves in a slight arc, in a front to rear vertical plane, about a center at pin 42 (FIG. 2), the rod clearance at the bore 38 permitting this degree of swing.

It is to be noted in reference to FIG. 2 that the rear dog portion or member 31 is somewhat lower than the forward portion 29, so that an overtaking pusher 30 will not crowd dog 28 down far enough that the pusher 30 might clear over the top of portion 29, as in the higher speeds of operation. Hence an initial, at least partial engagement of these two parts is assured.

In respect to the unitary nature of the two dogs 29, 31, as well as in the direct adjustable and swivel connection of bumper tongue 43 to the load carrier 12 and the trolley pusher structure, the invention affords a considerable simplification and consequent reduction of production costs of the improved accumulating carrier.

As shown in FIGS. 2 and 3, the pivoted bracket 14 at the rear of the body frame 12 of each load carrier 10 has the rear bumper 47 fixedly mounted thereon; and this bumper (FIG. 3) may be in the form of a length of rod stock formed in a generally oval loop of horizontal width corresponding to that of front bumper 43 at its widest zone, the ends of this length being brought inwardly parallel to one another and welded to the bottom web 55 of pivoted bracket 14. The latter is biased upwardly, counterclockwise about its pivot at 16, by means of a coil tension spring 56 anchored at its ends to the frame 12 and web 55, respectively. This permits the rear bumper 47 to yield downwardly in the event of a maladjustment of the forward bumper 43 of a load carrier 10 impacting it, thus preventing possible damage to parts.

FIG. 2 shows the forward bumper 43 of an impacting carrier 10 as (dotted line) inwardly engaging and riding upwardly upon the rear of a preceding carrier bumper 47, then (dot-dash line) coming to rest upon the top of bumper 47, with the forward end of the impacting frame engaging the rear of bumper 47 in the horizontal plane of the latter for a positive accumulation stop.

In reference to the rear trolleys 17 of each pair, they are, save for the motion of the pusher dog means with which the trolley 16 is equipped, and the various tongue and control features associated with the latter, identical to what is described above, particularly in reference to the trolley-load member swivel connection. Accordingly, corresponding reference numerals, primed, are employed to designate corresponding parts, and further description is dispensed with.

Reference has been made to the fact that in high speed operation there is a possibility that the dog 28, on being overtaken from the rear by a pusher 30 riding from its rear dog portion 31, will not rise in return fast enough to assure engagement of the pusher 30 with the forward dog portion 29, i.e., there is the possibility that the pusher 30 will clear over dog portion 29 without picking up the trolley 16. Provision is made in the alternative embodiment of FIGS. 7–13 to prevent this possibility, as well as to present further operational advantages.

FIGS. 7–13, inclusive, illustrate a further improvement under the invention, in which the carrier, as generally designated 58, has, in addition to bumper means for the downward retraction of its forward trolley dog in response to impacting a preceding load unit or other object, further means on its forward bumper tongue sub-assembly for accomplishing this result in response to selective actuation by a side-track signaling unit (not shown). Other specific structural improvements are also incorporated in this embodiment.

Thus, the load carrier body or bar 59 is, as before, in the form of an inverted channel of substantial length having a central load suspending bail 60 welded or otherwise fixedly secured in depending relation thereto between the side walls or flanges 61 thereof. Adjacent the forward (left in FIG. 7) and rear ends thereof, the top of load bar 59 is provided with circular bearing-receiving openings 62 of substantial diameter, coaxially beneath each of these openings there is a horizontal spacer and bearing guide 63. This guide is in the form of a rectangular plate having a central circular opening coaxial with the opening 62; and the guide 63 is welded at opposite sides to channel walls 61 and, as best illustrated in FIG. 9, the openings 62 and the bores of guide 63, receive the respective front and rear trolley bearings 65, 66. To facilitate assembly, the opening and bore are of slightly greater diameter than the bearing, and the outer bearing race is welded to guide 63 and the top of load bar 59. This affords a very stable support for bearings 65 and 66.

Forwardly of the front bearing means, the load bar 58 has a pair of depending straps 67 (see FIGS. 7 and 8) welded to its outer sides. These straps converge downwardly to lower ends which receive a transverse, horizontal pivot pin or bolt 68, this member providing a mount for the forward bumper tongue, which is generally designated by the reference numeral 69 and will be hereinafter described in detail.

The forward trolley 70 of the embodiment under consideration comprises connected upright body side members 71, 72 on which forward and rearward trolley guide rolls 73, as received in clevis openings 74, are journaled on vertical axes. These rollers travel between the laterally spaced, upright walls of horizontal load tracks 75, which (FIGS. 7 and 9) are of oppositely facing C-shaped cross section. The trolley halves 71, 72 are identical and are in part secured together by bolts adjacent the bottom thereof. They are further locked together at an upper zone by heat treated pins 76, the forwardmost encircled by a hardened roller 77 (for a purpose to be described), and the ends of pins 77, 76 are riveted on the outer sides of body members 71, 72 to complete the connection.

At a central point in its front to rear dimension, the trolley body members 71, 72 receive a horizontal axle 78, on opposite ends of which a pair of load rollers or wheels 79 are mounted, as by appropriate anti-friction means (not shown), these wheels riding the upper surfaces of the tracks 75.

Directly beneath the axle 78, reference being had again to FIGS. 7 and 9, the trolley body members 71, 72 are formed to provide enlarged arcuate bosses 81 which, when the trolley parts are assembled, encircle a vertically elongated shaft housing sleeve 82, the sleeve being vertically anchored appropriately, as by a split ring 83 acting between the same and bosses 81.

Two inner races 85 of bearing 65 are secured about sleeve 82 at vertically spaced zones; and the outer races 86 of this bearing are welded to the load bar and guide 63, as described above. The bearing structure is completed by a retaining nut 87 and lock nut 88 threaded upwardly on the lower end of sleeve 82, with a lock washer placed between the nuts.

The structural features of the bumper tongue 69 are shown in FIGS. 7 and 10–12. It is in the form of a casting providing transversely aligned tubular side bosses 90, in which the pivot bolt or pin 68 is received, the casting being of reduced width (FIG. 8) to go between the bottom ends of the forward load bar straps 67.

Forwardly of this pivotal means, the bumper casting is laterally enlarged substantially on either side at 91, the forward ends of which enlargement integrally join through a mildly arcuate forward impact face 92 which, as shown in FIGS. 7 and 12, inclines downwardly and rearwardly, so that it may ride upwardly over the rear bumper of a preceding trolley, as indicated in dotted line in FIG. 7, or upwardly on some other fixed object. The casting is of forwardly dished outline (FIG. 12) and may be apertured at 93, without significant loss of strength and rigidity, to allow the escape of any material which might fall therein. The casting of tongue 69 is also centrally apertured in a laterally elongated, generally oblong outline at 94 to accommodate bearing means for the tongue pivot member 68.

Rearwardly of the pivot bosses 90, the tongue 92 terminates in forked clevis legs 95 which are horizontally apertured to receive a swivel member (to be described); and the legs have oppositely facing pairs of integral bosses 96 which are drilled and threaded to receive bolts 98. As best illustrated in FIG. 10, a side bracket 99 may thus be fastened to the tongue 69 at either side of the latter, as illustrated in solid or dotted line in FIG. 10.

The bracket is a reinforced one of approximately Z-shaped cross section, including a depending leg through which bolts 98 are applied and the upright, laterally spaced leg 100, in which a follower roller 101 is appropriately journaled on a horizontal axis, the function of this roller to be later described.

Again referring to FIG. 7, the forward trolley 70 has front and rear bosses 103 in the component side members 71, 72 thereof, the rear-most of which receives a pivot member or pin 104 for a rear hold-back dog 105, which is counterweighted at 106 to bias the same clockwise. The corresponding forward boss 103 does not have such pivot means, but permits the use of identical trolley halves 71, 72 for any direction of travel, without requiring different right or left hand parts. Dog 105 is, in the usual manner, overtaken by the power line pusher 30 as the latter comes into driving engagement with the trolley 70, or passes thereover without moving it along.

The forward dog of the trolley and associated load bar 59 is generally designated by the reference numeral 108. It is illustrated in solid line in FIG. 7 in a raised position in which it is drivingly engaged by pusher 30, and in dotted line in a lowered position to permit the pusher to pass forwardly to the left thereover when accumulation of trolleys is desired. The dog 108 is sustained and actuated solely by the forward bumper tongue 69, in a manner to be described. It comprises an upper casting 109 of somewhat vertically elongated nature, being formed to provide an upper, forwardly and downwardly inclined surface 110 and a rear vertical pusher-engaged surface 111. This merges at its lower end in a rounded rear recess 112, at which the dog 108 is adapted to engage upwardly against a roller 113 placed on the wheel axle 78 of trolley 70, thus to limit upward movement of dog 108. Forwardly of pusher surface 111, the dog 108 is engageable with the hardened roller 77 to take and transfer to the trolley body proper the forward thrust of the power pusher 30.

The bottom end of the dog casting 109 is vertically upwardly recessed for the reception of a vertically acting control member or rod 114, this member being suitably fixed rigidly to the dog, and, extending through the bore of shaft housing sleeve 82, as shown in FIGS. 7 and 9, to act as a unitary extension of casting 109. There is substantial side clearance between control rod 114 and the sleeve bore to accommodate some degree of front-to-rear relative movement. The lowermost end of control member 114 is reduced in diameter and threaded at 115 for threaded engagement, as in the earlier embodiment, through a swivel pin 116 which is journaled in aligned circular holes 117 in the rear clevis legs 95 of the cast forward bumper tongue 92.

The operation of the load carrier structure 58 of FIGS. 7 through 13 is the same as that described above in the embodiment of FIGS. 1 through 6, in that an impacting of a preceding halted carrier causes swing of the tongue 69 from the solid line to the dotted line position of FIG. 7, consequently lowering dog 108 to the dotted line position for accumulation behind the halted carrier, or behind some other obstructing object. However, the tongue subassembly 69 additionally affords a mount for the follower roller 101. The bracket 99 for this roller may be secured to the side of the tongue at its bosses 96, as indicated in solid and dotted line in FIG. 10.

Thus, a side-track, selective signal unit may be engaged, or not, by the roller 101, in the former case causing a clockwise movement (FIG. 7) of tongue 69, and a lowering of the dog 108, in the same way as in response to an impact operation. As in the first-described embodiment, the advantages of positive dog control in straight line travel and rounding track bends is had, coupled with a two-directional, universal type joint between dog 108 and tongue 69. As in the first embodiment, the dog 108 is gravity-biased to its top position by the forward weight of tongue 69.

The rear trolley 118 of the embodiment of FIGS. 7 through 13 closely resembles the forward trolley 70 save for the fact that it lacks dog provisions, it being only a load support and traveling guide unit. Accordingly, to the extent that features of trolley 118 and its bearing connections to load bar 59 correspond to those described above in reference to the forward trolley, such features will be designated by corresponding reference numerals, primed, and further discussion thereof is dispensed with.

In this embodiment, reference being had to FIGS. 7 through 13, upright tail bumper support plates 120 are welded to the outer sides of load bar 59 at the rear thereof, the plates angling downwardly and to the rear, then terminating in generally horizontal tail extensions 121, each of which has a rear arcuate relief or recess at 122. An arcuate, laterally flared rear bumper bar 123 has inwardly convergent legs 124 welded to the plates, with a connecting rearwardly convex cross piece 125 resting upon the recesses 102, as shown in FIG. 13 and welded thereto.

FIG. 7 shows the load bar 59 as being provided with a transversely outwardly extending lug 126 welded on its top directly behind the forward bearing 65. This member 126 is adapted to be employed for a purpose not particularly germane to the present invention. For example, it may constitute a driven dog for the unit 58, by which the latter may be impelled by a transfer conveyor (not shown) in the moving of the unit independently of power chain pusher 30, as into or out of an exit or entrance switch.

The improvements of the present invention have the advantage of low cost of production, as by eliminating parts and the like, without sacrifice of reliability in operation, yet having direct, positive and universal pivot connections and actions, adjustability and the like. Although illustrated in an application to a typical overhead conveyor system, it is readily evident to those skilled in the art that the provisions of the invention are applicable to other types of conveyor in which accumulation of successive load carriers, as driven by positive propelling means, is desired.

What we claim as our invention is:

1. In an accumulating carrier of the type having a support member provided with horizontally journaled wheel means mounting the same for travel, a dog on said support member engageable by propulsion means for said travel of the support member, said dog being movable to position the same for releasable propelling engagement by said propulsion means, and a load member sustained by said support member to travel therewith and to swivel relative thereto about an upright axis; the improvement to control the positioning movement of said dog, comprising a movable control element to govern the dog movement, an operating element mounted on said load member to move relative to the latter upon engagement of the operating element with another object, and means providing a positive, bi-directional operating connection between said operating and control elements to move the control element upon said movement of the operating element.

2. The improvement of claim 1, in which said control element acts on said upright axis.

3. The improvement of claim 1, in which said connection means affords a positive pivotal union of said elements to one another in the movement thereof, and comprises an element having a positively coupled engagement by one of said control and operating elements and a positively guided swivel engagement by the other of said elements.

4. The improvement of claim 1, in which said control element has a fixed connection to said dog.

5. The improvement of claim 4, in which there are a pair of integrally connected dogs engageable by said propulsion means.

6. The improvement of claim 1, in which said dog has a fixed connection to said control element, and further comprising a hold back dog movably mounted on said support member to the rear of said first named dog, said hold back dog being movable relative to the first named dog upon engagement by said propulsion means.

7. In an accumulating carrier structure of the type having a load supporting unit provided with horizontally journaled wheel means, a control member for said load supporting unit having means mounting the same for linear movement on and relative to the latter in one plane, and an operating member mounted for swinging movement on said load supporting unit upon engagement with an object not on said unit, said operating member also having pivotal action in relation to a part of said load unit in a plane transverse of said one plane in the accumulating travel of the carrier structure; the improvement in means providing a positive, two-directional operating connection of said control and operating members to one another to move the former linearly in response to said swinging movement of the latter, comprising means affording a swivel connection of said operating member to said control member on an axis in the line of movement of the latter and a pivotal connection of said members to one another at said swivel connection on an axis transverse of the swivel axis.

8. The carrier structure of claim 7, in which said operating member is one projecting laterally of the path of travel of said load supporting unit for engagement and operation by a side track signal or equivalent unit.

9. The carrier structure of claim 7, in which said operating member comprises a bumper projecting forwardly of said load supporting unit for engagement with an object forwardly of said unit to thus swing the bumper.

10. The carrier structure of claim 7, in which said operating member comprises a bumper projecting forwardly of said load supporting unit for engagement with an object forwardly of said unit to thus swing the bumper, said bumper being provided with means projecting transversely of the path of travel of said unit for actuation by a signaling unit to similarly swing said bumper and produce movement of said control member.

11. The carrier structure of claim 7, in which said operating connection comprises a pair of coacting clevis and pivot parts operatively connected to said members.

12. The carrier structure of claim 7, in which said operating connection comprises a pair of coacting clevis and pivot parts operatively connected to said members, said control member having threaded engagement with said pivot part.

References Cited

UNITED STATES PATENTS

| | | | |
|---|---|---|---|
| 1,178,197 | 4/1916 | Willard | 105—156 |
| 1,224,368 | 5/1917 | Feltes | 287—14 |
| 2,604,011 | 7/1952 | Cohen | 287—96 |
| 3,044,416 | 7/1962 | Reibel et al. | 104—172 |
| 3,049,083 | 8/1962 | Potter et al. | 104—94 |

ARTHUR L. LA POINT, *Primary Examiner.*

J. E. BABER, *Assistant Examiner.*